(12) United States Patent
Erhart et al.

(10) Patent No.: US 8,478,826 B2
(45) Date of Patent: Jul. 2, 2013

(54) CONDITIONING RESPONSES TO EMOTIONS OF TEXT COMMUNICATIONS

(75) Inventors: George Erhart, Loveland, CO (US); Valentine Matula, Granville, OH (US); David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 356 days.

(21) Appl. No.: 12/833,182

(22) Filed: Jul. 9, 2010

(65) Prior Publication Data
US 2012/0011208 A1 Jan. 12, 2012

(51) Int. Cl.
*G06F 15/16* (2006.01)
(52) U.S. Cl.
USPC ......... 709/206; 709/204; 709/224; 705/14.12
(58) Field of Classification Search
USPC .................. 709/204, 206, 224; 705/14.12
See application file for complete search history.

(56) References Cited

U.S. PATENT DOCUMENTS

| | | | |
|---|---|---|---|
| 2003/0093317 A1* | 5/2003 | Robinson et al. | 705/14 |
| 2003/0204604 A1* | 10/2003 | Adar et al. | 709/228 |
| 2005/0159998 A1* | 7/2005 | Buyukkokten et al. | 705/11 |
| 2005/0213743 A1* | 9/2005 | Huet et al. | 379/265.09 |
| 2006/0009994 A1* | 1/2006 | Hogg et al. | 705/1 |
| 2009/0055435 A1* | 2/2009 | Kiviluoto et al. | 707/104.1 |
| 2011/0125550 A1* | 5/2011 | Erhart et al. | 705/7.29 |
| 2011/0153414 A1* | 6/2011 | Elvekrog et al. | 705/14.43 |

OTHER PUBLICATIONS

RightNow, "Customer Service Meets Social Media: Best Practices for Engagement," www.rightnow.com/files/whitepapers/Social_Contact_Center.pdf, Printed Jul. 8, 2010, 10 pages.
Stodder, David, "Companies Such as JetBlue Have Used it to Mine E-Mails and Other Customer Feedback for Insight," www.informationweek.com/news/business_intelligence/analytics/showarticle.jhtml?articleID=222600276, Printed Jul. 8, 2010, 4 pages.
Exaudios Technologies, www.exaudios.com, "Monitor & Improve Vocal Performance," Printed Jul. 8, 2010, 2 pages.
Chavez, David, et al., U.S. Patent Application entitled "Social Network Urgent Communication Monitor and Real-Time Call Launch System," U.S. Appl. No. 12/720,923, filed Mar. 10, 2010, 37 pages.

* cited by examiner

*Primary Examiner* — Wing F Chan
*Assistant Examiner* — Hitesh Patel

(57) ABSTRACT

A text communication, such as an email or blog posting from a user, is monitored to identify an issue. A score(s) of the text communication is determined by analyzing words/phrases in the text communication. A score can be based on various factors such as annoyance, language precision, help-ability, a communication length, and the like. A range for the score(s) is determined. When a response to the text communication is generated, a score(s) of the response to the text communication is determined. If one or more of the score(s) of the response is outside the range for the score(s), the response is rejected. Words/phrases are identified in the response to the text communication that can be changed in order to get the score(s) of the response within the range of the score(s) of the text communication. This information is displayed to an agent so an appropriate response can be formulated.

22 Claims, 5 Drawing Sheets

US 8,478,826 B2

CONDITIONING RESPONSES TO EMOTIONS OF TEXT COMMUNICATIONS

TECHNICAL FIELD

The system and method relates to monitoring text communications and in particular to monitoring text communications to determine an appropriate response to the text communications.

BACKGROUND

In today's world, as the use of different types of social mediums increase, contact centers have tried to accommodate the needs of these diverse types of communication mediums. Contact centers now handle social mediums such as email, Instant Messaging (IM), and social networks like blog sites, Facebook®, Twitter®, and the like. As emails/IMs or other inbound text communications are received at the contact center, a contact center agent will then respond to issue(s) that are raised in the text communication. Likewise, the agent may look at postings on various social networks to identify issues raised by users on the social networks. The agent can then respond to the issue by posting a response to the issue on the social network.

However, at times, the response by the agent may not correctly take into account the emotion involved by the user who sent the inbound text communication or posted the message on the social network. This can result in the response appearing to be too harsh or too apathetic. If the inbound communication/social network post uses emotionally charged language, the agent may respond in a similar manner. This can result in lost customer satisfaction, potential loss of customers, and lost business opportunities.

SUMMARY

The system and method are directed to solving these and other problems and disadvantages of the prior art. A text communication such as an email or blog posting from a user is monitored to identify an issue. A score(s) of the text communication is determined by analyzing words/phrases in the text communication. A score can be based on various factors such as annoyance, language precision, help-ability, a communication length, and the like. A range for the score(s) is determined. When a response to the text communication is generated, a score(s) of the response to the text communication is determined. If one or more of the score(s) of the response is outside the range for the score(s), the response is rejected. Words/phrases are identified in the response to the text communication that can be changed in order to get the score(s) of the response within the range of the score(s) of the text communication. This information is displayed to an agent so an appropriate response can be formulated.

Other options allow the score(s) of the text communication and/or the range of the score of the text communication to be normalized based on various factors such as other communications by the user and communications by different users.

BRIEF DESCRIPTION OF THE DRAWINGS

These and other features and advantages of the system and method will become more apparent from considering the following description of an illustrative embodiment of the system and method together with the drawing, in which.

DETAILED DESCRIPTION

Figure 1:
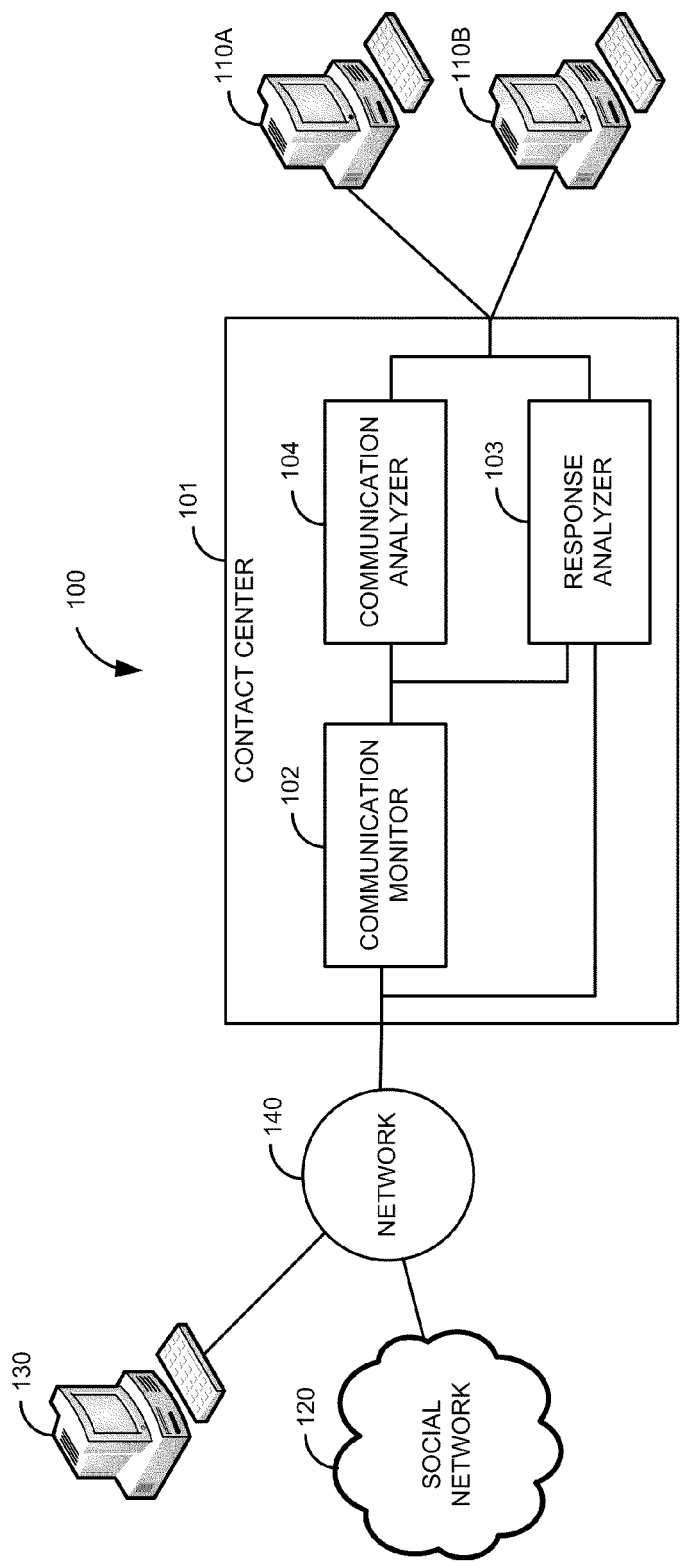
FIG. 1 is a block diagram of a first illustrative system for monitoring text communication(s) to determine a response.

FIG. 1 is a block diagram of a first illustrative system 100 for monitoring text communication(s) to determine a response. The first illustrative system 100 comprises a contact center 101, agent terminals 110A-110B, social network(s) 120, a user communication device(s) 130, and network(s) 140.

Contact center 101 can be any type of contact center that can process communications. Contact center 101 can be a Private Branch eXchange (PBX), a server, a network server, and the like. Contact center 101 is shown as a single device, but can be multiple devices that are distributed across network 140. Contact center 101 further comprises communication monitor 102, communication analyzer 104, and a response analyzer 103. Communication monitor 102 can be any type of hardware/software that can monitor communications. For example, communication monitor 102 can monitor emails, Instant Messages (IM), communication on social network 120, voice communications, video communications, and the like. Communication analyzer 104 can be any hardware/software that can analyze communications such as text communications, voice communications, video communications, and the like. Response analyzer 103 can be any hardware/software that can analyze text communications, voice communications, video communications, and the like.

Agent terminals 110A-110B can be any type of communication device that a contact center agent can use to view, analyze, and/or respond to communications that are processed by contact center 101. For example, agent terminals 110A-110B can be a personal computer, a telephone, a Personal Digital Assistant (PDA), a combination of these, and the like. FIG. 1 shows two agent terminals; however, the number of agent terminals 110 can be one to any number necessary to meet the needs of contact center 101.

Social network 120 can be any type of social network such as a blog site, Facebook®, Twitter®, LinkedIn®, and the like. Social network 120 can comprise multiple social networks. Network 140 can be any type of network that can communicate information between social network 120, user communication device 130, and contact center 101. For example, network 140 can be the Internet, a Local Area Network (LAN), Wide Area Network (WAN), an intranet, the Public Switched Telephone Network (PSTN), a cellular network, a combination of networks, and the like. User communication device 130 can be any type of device that allows a user to communicate with contact center 101 and/or social network 120. For example, user communication device 130 can be a telephone, a personal computer, a PDA, a portable communication device, and the like. Social network 120 and user communication device 130 are shown connecting to contact center 101 through network 140. However, social network 120 and/or user communication device 130 can connect directly to contact center 101.

Communication monitor 102 monitors a text communication to identify an issue. The text communication is generated by a user. A user can be a user of social network 120, a user of contact center 101, and the like. An issue can be something that may be of interest to contact center 101 such as a political issue, a comment on a product/service, a comment about a company, and the like. A text communication can be an email, an Instant Message, a posting by a user on social network 120, text of feed from a social network 120 (e.g., a Really Simple Syndication (RSS) feed), a combination of these, and the like. When referring to a text communication herein (including the claims), a text communication can be part of a text communication. A text communication can comprise a part of the text communication that deals with the issue. For example, if a user posted a text communication on social network 120 that comprises a complaint about a product that contact center 101 supports and information about how to fix a car (information not relevant to contact center 101), the text communication may comprise the portion of the text communication relevant to the complaint about the product that contact center 101 supports. A text communication can also comprise multiple text communications. For example, a text communication can comprise a posting on social network 120 and an email sent to contact center 101 by the user. Communication analyzer 104 determines a score(s) of the text communication. A score of the text communication is a score that can be based on various factors such as annoyance (type of language the person uses), language precision (wordy, very text-abbreviated, etc.), help-ability (are they looking for a resolution or just angry and not looking for an answer), communication length (i.e., a long length may require a long response), and the like. The score(s) for these factors can be determined in various ways. For example, an annoyance score of the text communication can be determined by giving a number (i.e., positive and/or negative) to specific words/phrases (a phrase can be one or more words) in the text communication. Another option would be to divide the total score of the words/phrases by the number of words in the text communication to get the annoyance score, or the total could be normalized based on the number of words in the text communication. The words/phrases used to determine the annoyance score can be profane words, vulgar words, words indicating emotion (e.g., hate, like, terrible, and the like) emotionally charged phrases (e.g., "this product sucks"), and the like. The annoyance score can be based on positive words/phrases and/or negative words/phrases. For instance, the annoyance score could be adjusted upward based on positive words and adjusted downward based on negative words. Likewise, similar methods can be used for other scores, such as a language precision score, by looking at the types of abbreviations, slang, and the like being used. For a help-ability score, communication analyzer 104 can look for questions, and other types of indicators that indicate that the person is looking for a response to the question. For a communication length score, communication analyzer 104 can look at the length of the communication to determine a score of the text communication. Some or all of these scores can be combined in various ways to produce one or more scores.

Communication analyzer 104 determines a range and/or ranges for the score(s) of the text communication. If there are multiple scores for the text communication, a range for each and/or some scores (e.g., annoyance score, language precision score, help-ability score, and/or length score) can be determined. A range can be determined based on a variety of factors, such as normalization information and/or configuration information. Normalization information is information about the user and/or other users and their communications that can be used as a baseline for the text communication. The score of the text communication can fall within the range of the score or can fall outside the range for the score of the text communication. Configuration information can be information defined by an administrator of contact center 101, such as an administrable range, a range based on the issue, a range based on the user who created the text communication (e.g., Joe is a key customer and therefore has a smaller range than other customers), and the like.

Response analyzer 103 determines a score of a response to the text communication. If there are multiple scores of the text communication (e.g., an annoyance score and a length score), the response analyzer 103 can determine a score for each of the scores to the text communication (e.g., a response annoyance score and a response length score). The response can be a response that is generated by an agent at agent terminal 110A who has been assigned by contact center 101 to respond to the text communication. The score of the response(s) to the text communication can be determined in the same manner as the score of the text communication; the score for the response(s) to the text communication can be determined using a different process than was used for the score of the text communication.

Response analyzer 103 determines if the score(s) of the response to the text communication is outside the range for the score(s) of the text communication. If the score(s) of the response to the text communication is outside the range for the score(s) of the text communication, response analyzer 103 can reject the response and identify words/phrases in the response to the text communication that can be changed in order to get the score(s) of the response to the text communication within the range for the score(s) of text communication.

Otherwise, if the score(s) of the response to the text communication is within the range for the score of the text communication, response analyzer 103 sends the response to the text communication to the user. Sending the response to the text communication can be done in a variety of ways. For example, if the user posted the text communication on social network 120, sending the response can be accomplished by posting the response to the text communication on social network 120. Sending the response to the text communication can be done by sending an email, an IM, a social media response, or reply over any other medium to the user. The sent response can be done using the same medium or by using a different medium. For example, the text communication could be a post on social network 120 and the response to the text communication could be sent via an email.

Figure 2:
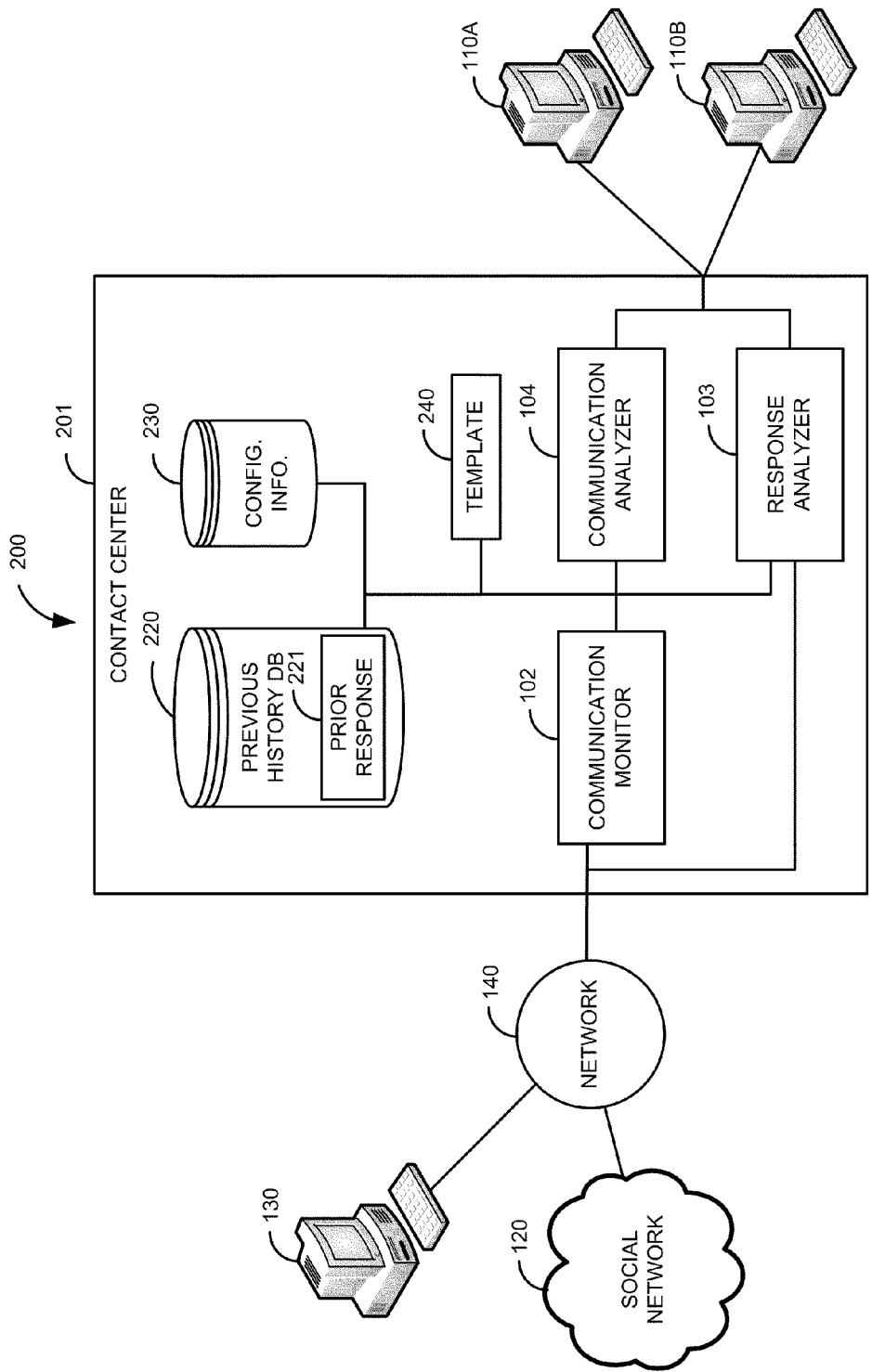
FIG. 2 is a block diagram of a second illustrative system for monitoring text communication(s) to determine a response.

FIG. 2 is a block diagram of a second illustrative system 200 for monitoring text communication(s) to determine a response. The second illustrative system 200 comprises contact center 201, agent terminals 110A-110B, social network(s) 120, a user communication device(s) 130, and network(s) 140.

Contact center 201 comprises communication monitor 102, communication analyzer 104, response analyzer 103, previous history database 220, configuration information 230, and template(s) 240. Previous history database 220 comprises prior response(s) 221. Previous history database 220 contains information in regard to the history of contact center 201, such as, prior interactions with customers/users of contact center 201, prior communications by other users, previously monitored communications on social network 120, and voice/video conversations with agents of contact center 201, prior responses 221 to different issues in contact center 201, and the like. Configuration information 230 comprises information to configure contact center 201. For example, configuration information 230 can be information to define a response time based on the score of the text communication (i.e., if the score is high, a shorter response time is given), information on the range of scores that will be used, information about how a score of a communication will be generated, and the like. Template 240 can be any type of template that an agent of contact center 201 can use in responding to a text communication such as an outline, a listing of information to include in the response, and the like.

To illustrate how the second illustrative system 200 works, consider the following example. Communication monitor 102 monitors an incoming email (text communication) that is sent from user communication device 130 to contact center 201 by a user. Communication analyzer 104 identifies a customer complaint about product XYZ (issue) in the email. Communication analyzer 104 determines a score of 50 for the email by looking at words, phases, context, and the like of the email. Communication analyzer 104 can also look in the previous history database 220 for prior responses 221 of prior communication(s) and score(s) of the prior communications with the person and/or another person to determine the score of the communication. The prior communications can be incoming and/or outgoing communications. Based on the current communication (and/or prior responses 221) communication analyzer 104 can use a variety of algorithms to determine a desired range for the score. In this example, communication analyzer 104 determines a range for the score of the email based on an administered range for the customer complaint for product XYZ of plus or minus five from configuration information 230; this defines a range for the score of the email from 45 to 55. The range for the score can vary based on the score of the email. For instance, a moderately annoying incoming email, by rule, requires a firm response; an emotionally hot email requires a response that is cooler. Another option would be to require a supervisor to review a very hot incoming email.

The email is sent to agent terminal 110 where an agent generates a response to the email. The agent can generate the response by using template 240, by using a prior response 221, by writing the response, by combinations of these, and the like. Response analyzer 103 could also automatically select prior response 221. Response analyzer 103 determines that the score of the response to the email is 60 using the same method to determine the score of the email. In this example, the higher score could indicate that the agent is responding with too much anger, emotional words, and the like. Response analyzer 103 rejects the agent's response to the email. Response analyzer 103 identifies words/phrases in the response to the email that can be changed by the agent in order to get the score of the response to the email to be within the range of the score of the email. The agent modifies the response to the email. Response analyzer 103 determines that the score of the modified response to the email is now 47 (within the range of the score of the email (45-55)) and sends the modified response to the email to the user of user communication device 130 in an email or Instant Message.

Figure 3:
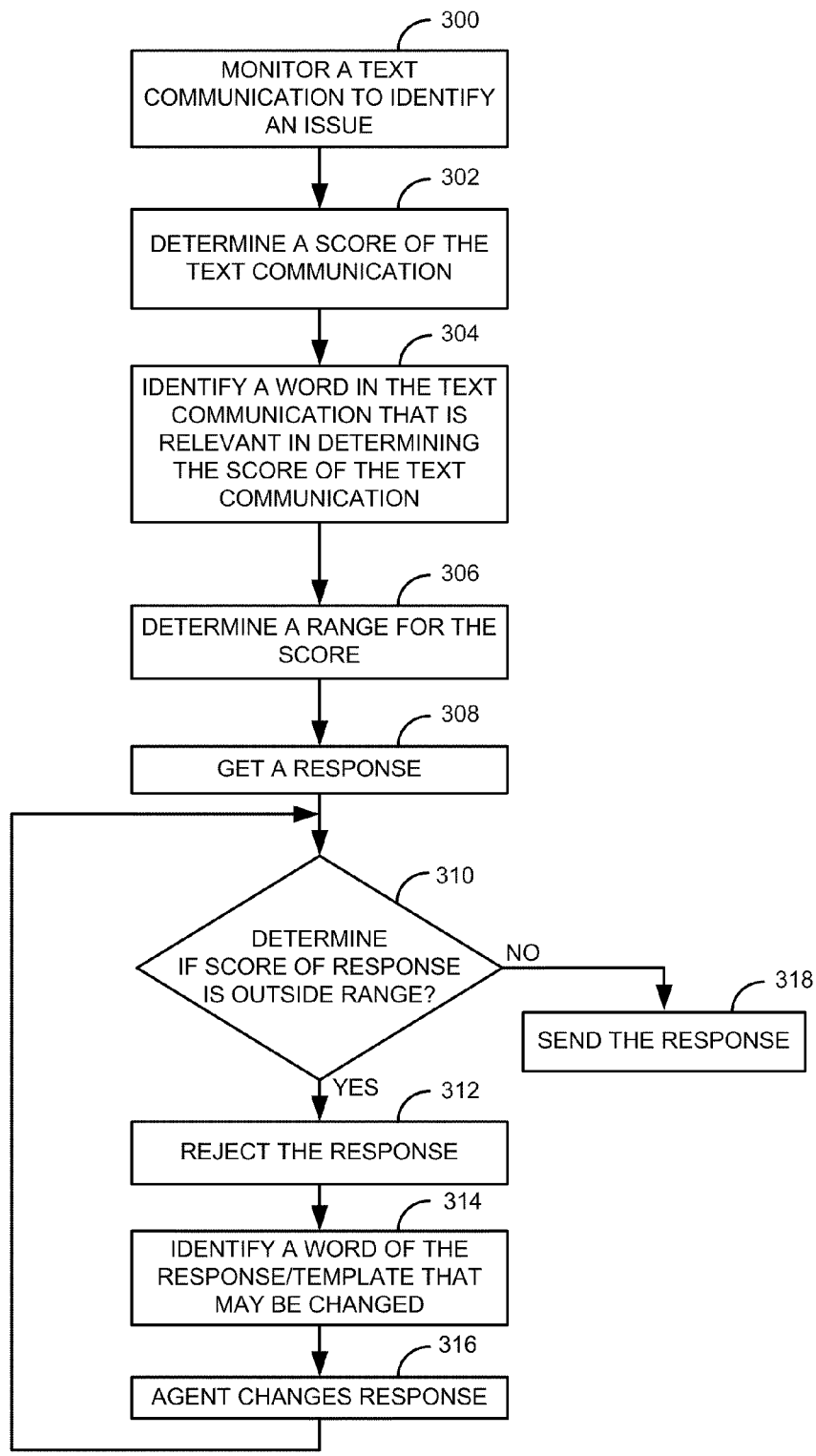
FIG. 3 is a flow diagram of a method for monitoring text communication(s) to determine a response.

The above systems of FIG. 2 and FIG. 3 show the systems in a contact center (101 and 201) environment as an example. However, all the elements (102, 103, 104, 240, 230, 220, and 221) within contact center (101 and 201) can exist outside a contact center (101, and 201) environment. For example, the contact center (101 and 201) could be replaced by an email system. The email system could monitor emails between different email users (like between the user and agent) and analyze the response made in response to a received email in a similar manner.

FIG. 3 is a flow diagram of a method for monitoring text communication(s) to determine a response. Illustratively, contact centers 101, 201, communication monitor 102, communication analyzer 104, response analyzer 103, agent terminals 110A-110B, social network(s) 120, network 140, and user communication device 130, comprise stored-program-controlled entities, such as a computer or processor, which performs the method of FIGS. 3-5 and the processes described herein by executing program instructions stored in a computer readable storage medium, such as a memory or disk.

Communication monitor 102 monitors 300 a text communication from a user to identify an issue in the text communication. A user can be a user of social network 120, a user of contact center 101, and the like. Communication analyzer 104 determines 302 a score(s) of the text communication. Communication analyzer 104 can identify 304 one or more words in the text communication that are relevant in determining the score(s) of the text communication. Identifying relevant words can be done in a variety of ways, such as highlighting words, bolding words, changing the color of words, using different fonts, using italics, using different font sizes, and the like. For example, relevant words can be identified in different colors based on how much the relevant words affect the score(s) of the text communication. Another option would be to identify words that affect the score positively in one color and words that affect the score negatively in another color.

Communication analyzer 104 determines 306 a range for the score(s) of the text communication. Response analyzer 103 gets 308 a response to the text communication. Response analyzer 103 determines 310 if the score(s) of the response to the text communication is outside the range of the score(s) of the text communication. If the score of the response to the text communication is within the range of the score(s) of the text communication in step 310, the response analyzer 103 sends 318 the response to the text communication to the user and is done.

Otherwise, if the score(s) of the response to the text communication is outside the range for the score(s) of the text communication in step 310, response analyzer 103 rejects 312 the response to the text communication. Response analyzer 103 identifies 314 one or more words/phrases that can be changed by an agent in order to get the score(s) of the response to the text communication to be within the range for the score(s) of the text communication. This can be accomplished when the agent is typing the response to the text communication. For example, pop-up text can be displayed with alternative suggestions. The agent changes 316 the response based on the identified words or phrases to get the score(s) of the response to the text communication to be within the range for the score(s) of the text communication. The process goes to step 310 to determine if the score(s) of the response is still outside the range for the score(s) of the text communication.

Figure 4:
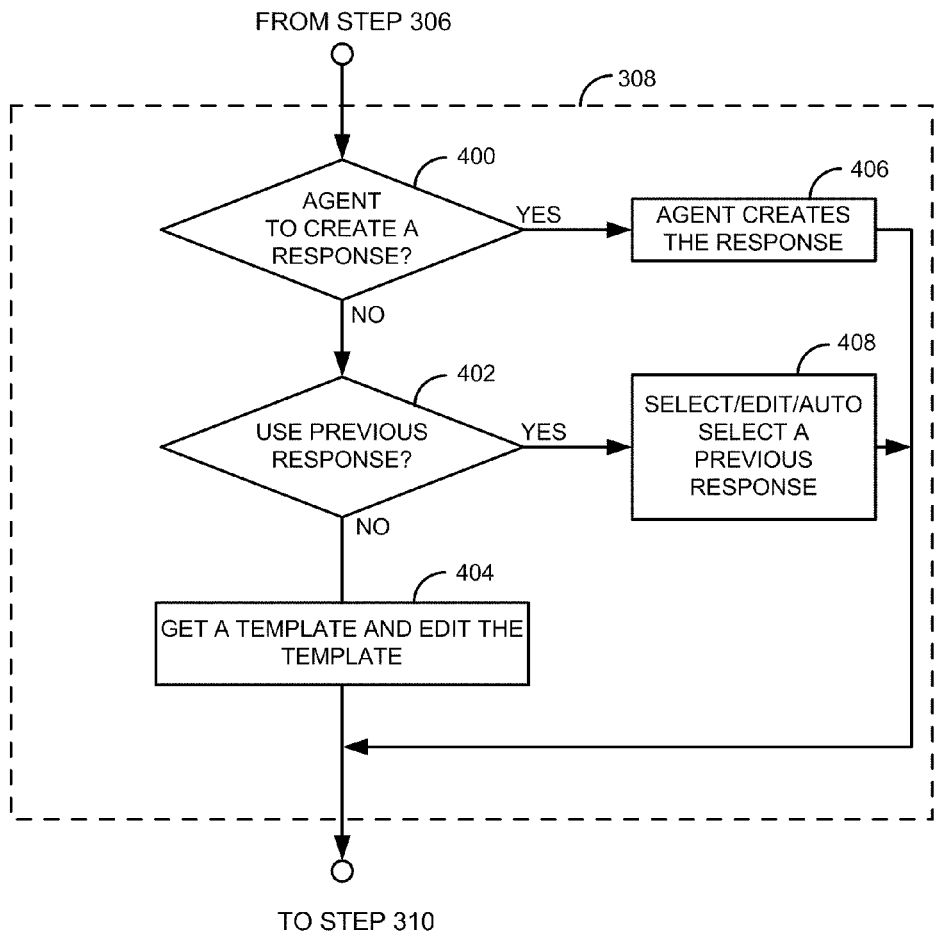
FIG. 4 is a flow diagram of a method for responding to text communication(s).

FIG. 4 is a flow diagram of a method for responding to text communication(s). FIG. 4 is an expanded view of step 308 from FIG. 3. After determining the range for the score(s) in step 306, the process determines in step 400 if an agent is to create a response. If an agent is to create a response in step 400, the agent creates 406 the response and the process goes to step 310. Otherwise, the process determines whether to use a previous response in step 402. If the agent is to select a previous response in step 402, the agent can select a response in step 408. The agent can select and edit a response in step 408. Also, a response can be automatically selected without agent intervention in step 408. The process then goes to step 310. If in step 402, it is determined not to use a previous response, the agent gets a template and edits the template to create the response. The process then goes to step 310.

Figure 5:
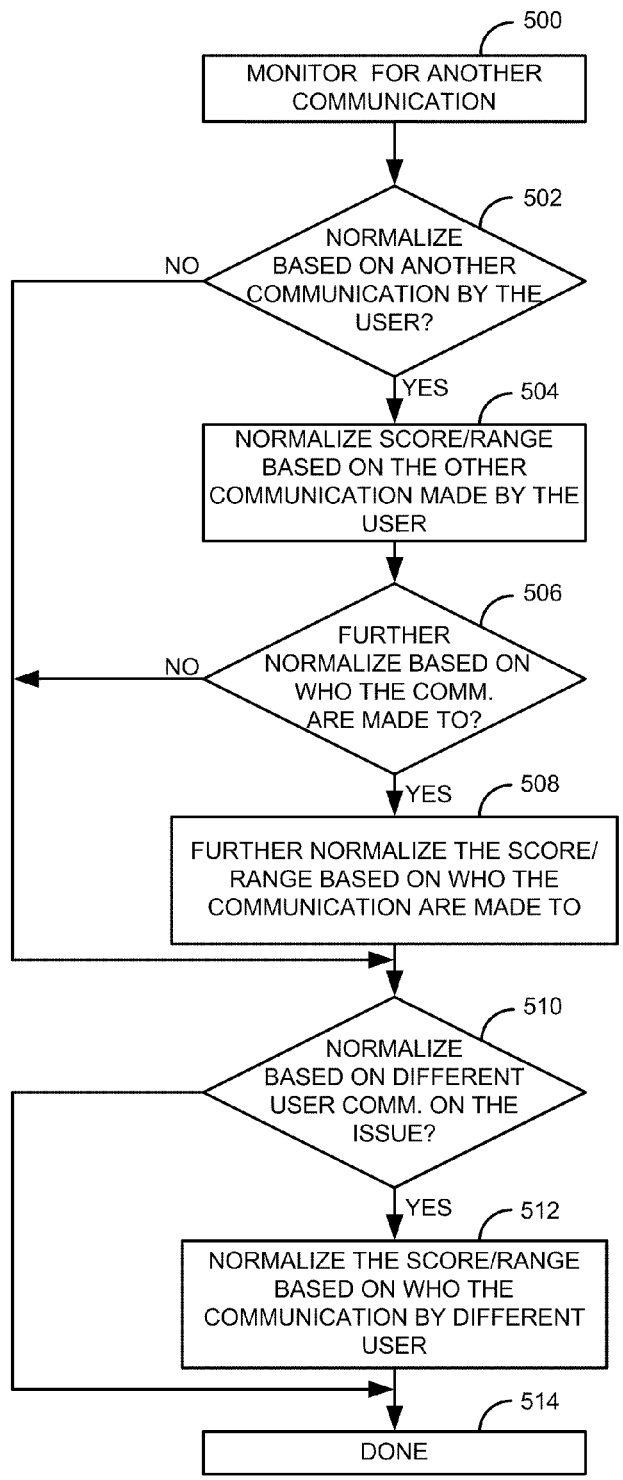
FIG. 5 is a flow diagram of a method for normalizing the score/range of a text communication.

FIG. 5 is a flow diagram of a method for normalizing the score/range of a text communication. Communication monitor 102 monitors 500 for another communication(s). Other communication(s) can be communications by the user and/or communication(s) by other users/devices. Other communication(s) can be previously monitored communication(s) that have been stored in the previous history database 220. Other communications can be communication(s) on social network 120, email(s), voice communication(s), voice mail(s), Instant Message(s), video communication(s), and the like. Communication analyzer 104 determines in step 502 if the score(s) should be normalized based on other communication(s) by the user. If the score(s) is not to be normalized based on other communication(s) by the user in step 502, the process goes to step 510.

Otherwise, if the score(s) is to be normalized based on other communication(s) by the user in step 502, communication analyzer 104 normalizes 504 the score(s) and/or range(s) for the text communication based on the other communication(s) made by the user. For example, assume that the non-normalized score of the text communication is 80 with a range of 20-50 (80 meaning a highly negative score with 50 meaning an average score). Communication analyzer 104 has analyzed previous voice communications to contact center (101 or 201) along with numerous postings on social network 120 by the user to determine that an average score for a communication by the user is 90. The user is always very negative and uses angry, emotional words when communicating. Based on a typical communication by the user, the score for the text communication is actually less emotional (by a score of 10) than a typical communication by the user. Communication analyzer 104 can use this to adjust the score of the text communication and/or the range of the score for the text communication downward. For example, the score of the text communication can be adjusted to 40 based on the fact that the score is 10 points less than an average communication by the user. As another example, if the score of the text communication was 50, but the average score of multiple other communications by the user was 20, then the score for the text communication could be adjusted to 80. Likewise, the range for the score of the text communication can be normalized.

Communication analyzer 104 determines in step 506 whether to further normalize 504 the score(s) and/or the range(s) for the score of the text communication based on who the other communications of the user were made to. If communication analyzer 104 determines in step 506 not to further normalize the score(s) and/or the range(s) for the score(s) of the text communication in step 504, the process goes to step 510. Otherwise, if communication analyzer 104 determines in step 506 to further normalize the score(s) and/or the range(s) for the score(s) of the text communication, communication analyzer 104 further normalizes 508 the score and/or the range(s) for the score(s) of the text communication based on who the other communications by the user were made to. For example, assume that the determined score of a business text communication is 60. If the average score of different communications by the user to friends and family is 30 and the score is 60 when communication in business situations, communications analyzer 104 can determine that the score of 60 is normal for the user in a business situation. In this example, communication analyzer 104 would normalize the score of the text communication to 50. This can also be done for the range for the score of the text communication.

In step 510, communication analyzer 104 determines whether to normalize based on different communications by different users on the issue. If communication analyzer 104 determines not to normalize based on different communications in step 510, the process is done 514. Otherwise, if communication analyzer 104 determines to normalize based on different communications by different users in step 510, communication analyzer 104 normalizes the score(s) and/or range(s) of the score(s) of the text communication based on communications by different users on the issue. For example, communication monitor 102 has monitored 50 different posts on the issue on social network 120 with an average score of 30. However, the text communication by the user has a score of 60, which is 30 points higher than the average. Communication analyzer 104 can normalize the score of the communication to 80 to allow for the much higher emotional response than an average response. The process is then done 514. Different types of normalization as described in steps 504, 508, and 512 can be done based on various methods that would be obvious to one of ordinary skill in the art.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method implemented by a processor, the method comprising:
   a. monitoring a text communication to identify an issue, wherein the text communication is generated by a user;
   b. determining a score of the text communication by the processor;
   c. determining a range for the score of the text communication;
   d. determining a score of a response to the text communication; and
   e. determining if the score of the response to the text communication is outside the range for the score of the text communication by the processor;
   wherein in the response to the text communication is a previous response, a template, or an agent-generated response that has a score that is outside the range for the score of the text communication and further comprising:
   rejecting the response to the text communication and identifying one or more words in the response to the text communication that can be changed in order to get the score of the response to the text communication to be within the range for the score of the text communication; and wherein identifying the one or more words in the response to the text communication is accomplished while an agent is typing the response to the text communication.

2. The method of claim 1, wherein the response to the text communication is a previous response, a template, or an agent generated response that has a score within the range for the score of the text communication and further comprising the step of sending the response to the text communication to the user.

3. The method of claim 1, wherein the score of the text communication or the range of the score of the text communication are normalized based on another communication by the user.

4. The method of claim 3, wherein the score of the text communication or the range of the score of the text communication are further normalized based on who the other communication by the user is made to.

5. The method of claim 1, wherein the score of the text communication or the range of the score of the text communication are normalized based on a communication on the issue by a different user.

6. The method of claim 1, further comprising the step of suggesting a response time based on the score of the text communication.

7. The method of claim 1, further comprising the step of identifying one or more words in the text communication that are relevant in determining the score of the text communication and identifying the one or more relevant words to an agent.

8. The method of claim 1, wherein the range for the score of the text communication or the score of the text communication are determined based on configuration information.

9. The method of claim 1, wherein the text communication is at least one of the following: an email, an Instant Message, a posting on a social network, and a feed from the social network.

10. The method of claim 1, wherein the score is based on one or more of the following: an annoyance score, a language precision score, a help-ability score, and a communication length score.

11. The method of claim 1, further comprises the step of determining if a supervisor will need to review the response to the text communication.

12. A system comprising:
   a. a communication monitor configured to monitor a text communication to identify an issue, wherein the text communication is generated by a user;
   b. a communication analyzer configured to determine a score of the text communication and determine a range for the score of the text communication; and
   c. a response analyzer configured to determine a score of a response to the text communication and determine if the score of the response to the text communication is outside the range for the score of the text communication;

wherein in the response to the text communication is a previous response, a template, or an agent-generated response that has a score that is outside the range for the score of the text communication and wherein the response analyzer is further configured to reject the response to the text communication and identify one or more words in the response to the text communication that can be changed in order to get the score of the response to the text communication to be within the range for the score of the text communication; and wherein identifying the one or more words in the response to the text communication is accomplished while an agent is typing the response to the text communication.

13. The system of claim 12, wherein the response to the text communication is a previous response, a template, or an agent-generated response that has a score within the range for the score of the text communication and wherein the response analyzer is further configured to send the response to the text communication to the user.

14. The system of claim 12, wherein the score of the text communication or the range of the score of the text communication are normalized based on another communication by the user.

15. The system of claim 14, wherein the score of the text communication or the range of the score of the text communication are further normalized based on who the other communication by the user is made to.

16. The system of claim 12, wherein the score of the text communication or the range of the score of the text communication are normalized based on a communication on the issue by a different user.

17. The system of claim 12, wherein the communication analyzer is further configured to suggest a response time based on the score of the text communication.

18. The system of claim 12, wherein the communication analyzer is further configured to identify one or more words in the text communication that are relevant in determining the score of the text communication and identify the one or more relevant words to an agent.

19. The system of claim 12, wherein the range for the score of the text communication or the score of the text communication are determined based on configuration information.

20. The system of claim 12, wherein the text communication is at least one of the following: an email, an Instant Message, a posting on a social network, and a feed from the social network.

21. The system of claim 12, wherein the score is based on at least partially on one or more of the following: an annoyance score, a language precision score, a help-ability score, and a communication length score.

22. The system of claim 12, wherein the communication analyzer is further configured to determine if a supervisor will need to review the response to the text communication.

* * * * *